United States Patent
Wozniak et al.

(10) Patent No.: US 10,262,778 B2
(45) Date of Patent: Apr. 16, 2019

(54) MULTILAYER COMPONENT AND PROCESS FOR PRODUCING A MULTILAYER COMPONENT

(71) Applicant: EPCOS AG, Munich (DE)

(72) Inventors: Uwe Wozniak, Deutschlandsberg (AT); Thomas Feichtinger, Graz (AT)

(73) Assignee: EPCOS AG, München (DE)

(*) Notice: Subject to any disclaimer, the term of this patent is extended or adjusted under 35 U.S.C. 154(b) by 0 days.

(21) Appl. No.: 15/548,338

(22) PCT Filed: Nov. 4, 2016

(86) PCT No.: PCT/EP2016/076726
§ 371 (c)(1),
(2) Date: Aug. 2, 2017

(87) PCT Pub. No.: WO2017/089095
PCT Pub. Date: Jun. 1, 2017

(65) Prior Publication Data
US 2017/0372820 A1    Dec. 28, 2017

(30) Foreign Application Priority Data

Nov. 27, 2015   (DE) .................. 10 2015 120 640

(51) Int. Cl.
*H01C 7/10*       (2006.01)
*H01C 7/112*      (2006.01)
(Continued)

(52) U.S. Cl.
CPC .............. *H01C 7/112* (2013.01); *B32B 18/00* (2013.01); *C04B 35/453* (2013.01); *C04B 37/021* (2013.01); *C04B 37/023* (2013.01); *H01C 1/148* (2013.01); *H01C 7/1006* (2013.01); *H01C 7/108* (2013.01); *H01C 7/18* (2013.01); *H01C 17/00* (2013.01); *H01C 17/06533* (2013.01);
(Continued)

(58) Field of Classification Search
CPC ...... H01C 7/112; H01C 7/1006; H01C 7/108; H01C 17/06533; H01C 17/283; C04B 35/453; C04B 37/021; C04B 37/37023; C04B 2235/3217
See application file for complete search history.

(56) References Cited

U.S. PATENT DOCUMENTS

| 4,675,644 A | 6/1987 | Ott et al. |
| 4,959,262 A | 9/1990 | Charles et al. |

(Continued)

FOREIGN PATENT DOCUMENTS

| CN | 102318017 A | 1/2012 |
| DE | 10038425 A1 | 4/2001 |

(Continued)

*Primary Examiner* — Kyung S Lee
(74) *Attorney, Agent, or Firm* — Slater Matsil, LLP

(57) ABSTRACT

A multilayer component and a mathod for producing a multilayer component are disclosed. In an embodiment the multilayer component includes a ceramic main element being a varistor ceramic and at least one metal structure, wherein the metal structure is cosintered, and wherein the main element is doped with a material of the metal structure in such a way that a diffusion of the material from the metal structure into the main element during a sintering operation is reduced.

9 Claims, 3 Drawing Sheets

(51) Int. Cl.
*H01C 1/148* (2006.01)
*H01C 7/108* (2006.01)
*H01C 7/18* (2006.01)
*H01C 17/065* (2006.01)
*H01C 17/28* (2006.01)
*C04B 35/453* (2006.01)
*C04B 37/02* (2006.01)
*H01C 17/00* (2006.01)
*B32B 18/00* (2006.01)
*H01C 7/102* (2006.01)

(52) U.S. Cl.
CPC .... *H01C 17/283* (2013.01); *C04B 2235/3217* (2013.01); *C04B 2235/3241* (2013.01); *C04B 2235/3265* (2013.01); *C04B 2235/3277* (2013.01); *C04B 2235/3279* (2013.01); *C04B 2235/3284* (2013.01); *C04B 2235/3291* (2013.01); *C04B 2235/3294* (2013.01); *C04B 2235/3298* (2013.01); *C04B 2235/3409* (2013.01); *C04B 2235/3418* (2013.01); *C04B 2237/34* (2013.01); *C04B 2237/408* (2013.01); *C04B 2237/60* (2013.01); *H01C 7/102* (2013.01)

(56) References Cited

U.S. PATENT DOCUMENTS

| | | | |
|---|---|---|---|
| 6,260,258 | B1 | 7/2001 | Tokunaga et al. |
| 6,911,102 | B2 | 6/2005 | Niimi |
| 7,167,352 | B2 | 1/2007 | Matsuoka et al. |
| 7,510,673 | B2 | 3/2009 | Ohtani et al. |
| 8,058,965 | B2 * | 11/2011 | Block ................ H01C 1/148 257/774 |
| 8,970,324 | B2 * | 3/2015 | Dudesek ................ H01C 7/18 333/185 |
| 9,875,831 | B2 * | 1/2018 | Dernovsek ............ H01C 1/148 |
| 2008/0191834 | A1 | 8/2008 | Lien et al. |
| 2009/0116168 | A1 * | 5/2009 | Block .................... H01C 1/148 361/306.3 |
| 2009/0155624 | A1 * | 6/2009 | Dudesek ............... C04B 35/495 428/697 |
| 2010/0109804 | A1 * | 5/2010 | Feichtinger ............ H01C 7/10 333/172 |
| 2010/0117271 | A1 | 5/2010 | Lien et al. |
| 2010/0157505 | A1 * | 6/2010 | Feichtinger ............ H01G 4/30 361/301.4 |
| 2012/0032757 | A1 | 2/2012 | Dudesek et al. |
| 2012/0135563 | A1 | 5/2012 | Lien et al. |

FOREIGN PATENT DOCUMENTS

| | | |
|---|---|---|
| DE | 10026258 A1 | 12/2001 |
| DE | 10110680 A1 | 10/2002 |
| DE | 10132798 C1 | 1/2003 |
| DE | 102005026731 A1 | 3/2006 |
| DE | 112005001527 T5 | 9/2007 |
| EP | 0029749 | 6/1981 |
| EP | 0115050 A1 | 8/1984 |
| EP | 0189087 A1 | 7/1986 |
| EP | 1281184 A1 | 2/2003 |
| EP | 2276042 A2 | 1/2011 |
| JP | H11297507 A | 10/1999 |
| JP | 2001035741 A | 2/2001 |
| JP | 2004172466 A | 6/2004 |
| JP | 2007141953 A | 6/2007 |
| JP | 2007234995 A | 9/2007 |
| JP | 2010027804 A | 2/2010 |
| JP | 2010238882 A | 10/2010 |
| JP | 4998800 B2 | 8/2012 |
| JP | 2012517710 A | 8/2012 |
| WO | 2014206650 A1 | 12/2014 |

* cited by examiner

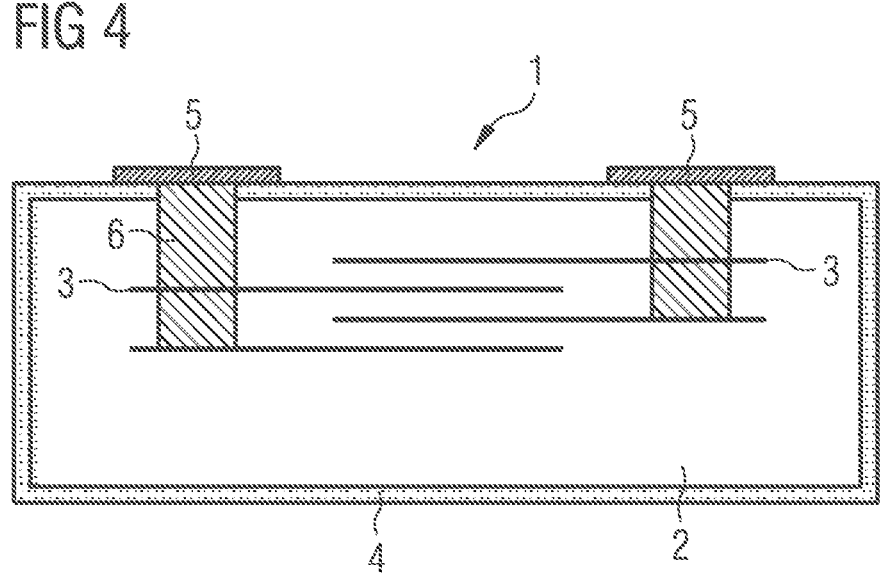
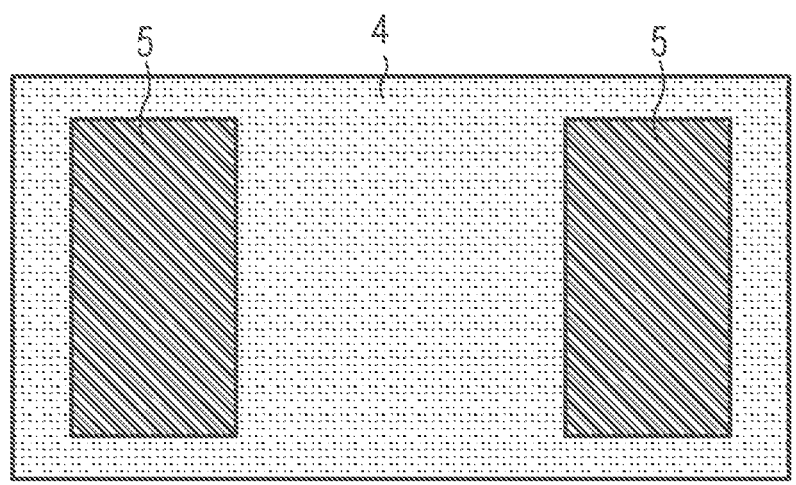

MULTILAYER COMPONENT AND PROCESS FOR PRODUCING A MULTILAYER COMPONENT

This patent application is a national phase filing under section 371 of PCT/EP2016/076726, filed Nov. 4, 2016, which claims the priority of German patent application 10 2015 120 640.4, filed Nov. 27, 2015, each of which is incorporated herein by reference in its entirety.

TECHNICAL FIELD

The present patent application relates to an electrical multilayer component and a process for producing a multilayer component.

BACKGROUND

Multilayer components based on zinc oxide are generally known as varistors. Costly internal electrodes composed of silver and palladium (Ag, Pd) are generally used for electrical contacting of multilayer varistors.

Internal electrodes composed of a silver-palladium alloy are frequently used for reducing diffusion of the electrode material into the ceramic material during the sintering operation, as is known, for example, from the document U.S. Pat. No. 4,675,644 A. The addition of palladium increases the melting point of the electrode layers in a suitable way, so that the electrode layer can be sintered together with the ceramic and diffusion of silver during sintering is reduced. However, the additional palladium has the disadvantage that palladium is very expensive.

In addition, varistors in which the reduction of the electrode layer during the sintering operation is countered by greater layer thicknesses of up to 10 µm are known, for example, from the document U.S. Pat. No. 4,959,262 A. These thick electrode layers have the disadvantage that delamination occurs to an increased extent due to different sintering behaviour of the materials. In addition, thicker internal electrodes have a greater volume requirement, which is found to be troublesome in the case of very small components. An object to be achieved is to provide a multilayer component having improved properties and a process for producing an improved multilayer component.

SUMMARY OF THE INVENTION

Embodiments provide a multilayer component.

According to one aspect, a multilayer component is described. The multilayer component, component for short, comprises a ceramic main element. The main element is, for example, a varistor ceramic. The main element is preferably a zinc oxide (ZnO) varistor. The main element comprises, for example, about 95 mol percent of ZnO. As further material of the main element, $Sb_2O_3$, $Bi_2O_3$, for example, in the range from 0.5 to 5 mol percent, can be present. The main element can further comprise $Co_3O_4$, $Mn_2O_3$, $SiO_2$, $Cr_2O_3$, e.g., in the range from 0.05 to 2 mol percent, for example, 0.5 mol percent. The main element can further comprise materials such as $B_2O_3$, $Al_2O_3$ and NiO in concentrations of less than 0.1 mol percent, for example, 0.05 mol percent.

The component further comprises at least one metal structure. The component can comprise a plurality of metal structures, for example, two or three different metal structures. The metal structures can be internal structures. This means that the metal structures can be arranged at least partly in an interior region of the main element. The metal structures can also be external structures. This means that the metal structures can be arranged in an external region of the main element. The main element and the metal structure are preferably cosintered. This means that main element and metal structure undergo a joint sintering process during the process for producing the component.

The main element is doped with a material of the metal structure. In particular, the main element is doped with a chemical compound of the metal of the metal structure. The main element is preferably doped with from 0.1 to 1 mol percent, for example, 0.5 or 0.7 mol percent, of a chemical compound of the metal of the metal structure. The amount of dopant in the main element is preferably such that the main element is saturated with the metal of the metal structure before a sintering operation. The main element is preferably doped with the material of the metal structure in such a way that diffusion of material from the metal structure into the main element during a sintering operation is reduced or preferably prevented.

The saturation of the main element with the metal of the metal structure leads to the main element no longer being able to take up any material of the metal structure during sintering. As a result, loss of material from the metal structure no longer takes place during sintering. Consequently, the loss of metal no longer has to be taken into account in selecting the type and amount of the metal structures. Thus, for example, no materials having a low diffusion constant have to be used. In addition, it is no longer necessary to provide significantly more metal than is actually required after sintering, but instead the amount of metal can be made much smaller and more precise. This leads to a reduction in costs and to significantly more accurately dimensioned metal structures after sintering, which is, in particular, critical in the case of very small structures.

In one illustrated embodiment, the metal structure has at least one internal electrode. The metal structure can have a plurality of internal electrodes. The internal electrodes are arranged within the multilayer component, in particular in the main element. In particular, the multilayer component has alternating ceramic layers of the main element with internal electrodes located in between. As an alternative or in addition, the metal structure can have at least one external metallization, for example, two external metallizations. The external metallization is arranged on an outside of the component. As an alternative or in addition, the metal structure can have at least one via, for example, two, three or four vias. The vias are arranged within the main element. The vias serve for at least partial through-contacting of the main element. For example, an external metallization can be connected to an internal electrode by means of a via.

The metal structure is preferably doped. The metal structure is preferably doped with a material of the ceramic main element. For example, the metal structure is doped with ZnO. As an alternative, the metal structure can be doped with $Sb_2O_3$, $Bi_2O_3$, $Co_3O_4$, $Mn_2O_3$, $SiO_2$, $Cr_2O_3$, $B_2O_3$, $Al_2O_3$, NiO or a combination thereof.

Saturation of the ceramic with metal of the metal structures enables disappearance or thinning of the metal structure during cosintering of ceramic and metal structure to be effectively prevented. Thus, in particular, very thin internal electrodes, external metallizations and/or vias can be formed. Very small and universally usable components can be realized in this way. A thickness or lateral extension of the metal structure is preferably less than or equal to 1.5 µm. For example, an internal electrode thus has a thickness of 1.5 µm or less, for example, 1.2 µm or 1.0 µm.

In one illustrative embodiment, the main element comprises bismuth oxide. As an alternative, the main element can also comprise praseodymium oxide. The main element is preferably a ceramic which has been sintered with the aid of liquid phases, with the metal structure being cosintered. In order to produce the multilayer component with, for example, very thin metal internal structures, it is necessary to provide a ceramic which can be sintered at a temperature below the melting point of the electrode material. For this reason, a liquid phase which exists at these low temperatures is required during sintering. Bismuth oxide has, for example, a melting point of less than 840° C. For this reason, bismuth oxide, for example, is used as liquid phase in the ceramic.

The use of bismuth oxide increases the diffusion of the material of the metal structure during sintering. The doping of the main element with the material of the metal structure enables diffusion of the material of the metal structure during the sintering operation to be effectively prevented despite the addition of bismuth oxide. In this way, the amount of bismuth oxide as sintering aid can be increased without an increased loss of material from the metal structure occurring. The increase in the proportion of bismuth oxide leads, for example, to a lower porosity of the component and thus to a component having improved properties.

In one illustrative embodiment, the metal structure comprises silver. The metal structure comprises essentially silver. The metal structure preferably comprises more than 95%, for example, 98% or 99% or 100%, of silver. In this case, the doping of the main element comprises silver oxide or silver carbonate. Doping of the main element with silver enables the loss caused by diffusion of electrode material from the metal structure to be effectively prevented. At the same time, the palladium in the metal structure can be dispensed with. The metal structure also does not require the use of very easily oxidized metals such as nickel or aluminium which during cosintering with the main element, which comprises, for example, a large proportion of zinc oxide, cause many problems, which would impair the quality of the multilayer component.

As a result of the doping of the main element, the silver content in the main element is always independent of sintering, the formation of the ceramic material of the main element or the shape and quantity of the metal structures. This leads to the main element always having very constant properties in respect of its thermal properties (thermal expansion, shrinkage) and also in respect of its electrical properties (capacity, V-I curve, robustness), regardless of what and how many metal structures are used.

Silver also has a low melting point compared to other metals, for example, palladium. Due to the use of silver as material of the metal structure, the sintering operation therefore has to be carried out at relatively low temperatures, for example, 960° C. or less.

In one illustrative embodiment, the metal structure comprises palladium. The metal structure comprises essentially palladium. The metal structure preferably comprises more than 95%, for example, 98% or 99% or 100%, of palladium. In this case, the doping of the main element comprises a palladium compound. Palladium has a higher melting point than silver. As a result of the use of palladium as material of the metal structure, the sintering operation can therefore be carried out at higher temperatures, for example, 1100° C. or more.

As a result of the doping of the main element, the palladium content in the main element is always independent of sintering, the formulation of the ceramic material of the main element or the shape and quantity of the metal structures. This leads to the main element always having very constant properties in respect of its thermal properties (thermal expansion, shrinkage) and also in respect of its electrical properties (capacity, V-I curve, robustness), regardless of what metal structures are used.

In one illustrative embodiment, the metal structure comprises an alloy of palladium and silver. For example, the alloy comprises 70% of silver and 30% of palladium. In this case, the doping of the main element comprises silver. The use of palladium and silver for the metal structure enables the sintering operation to be carried out at intermediate temperatures of less than 1100° C. but more than 960° C. For example, sintering here occurs at a temperature of about 1000° C.

In one illustrative embodiment, the multilayer component has at least one passivating layer. The passivating layer or insulating layer is preferably arranged at least on a surface of the main element. The passivating layer can be arranged around the entire surface of the main element. As an alternative, the passivating layer only partly covers the surface of the main element. The passivating layer is configured and arranged so as to protect the component against moisture and chemical media and/or insulate it electrically.

The passivating layer comprises, for example, a ceramic and/or a glass comprising a filler material. The passivation can comprise a varistor ceramic. The passivating layer is preferably cosintered. In other words, the main element, metal structure and passivating layer go through the sintering operation jointly. The passivating layer is therefore arranged on the main element before the sintering operation.

The passivating layer is preferably doped with the material of the metal structure, for example, silver or palladium. The amount of dopant is greater than or equal to a saturation concentration of the material of the metal structure in the passivating layer. The passivating layer can also be doped with material of the ceramic main element. The passivating layer is preferably doped with the main dopants of the ceramic main element. The passivating layer can be doped with $ZnO$, $Sb_2O_3$, $Bi_2O_3$, $Co_3O_4$, $Mn_2O_3$, $SiO_2$, $Cr_2O_3$, $B_2O_3$, $Al_2O_3$, $NiO$ or a combination thereof.

If the passivating layer is also sintered together with the metal structure, it represents a sink for the diffusing material of the metal structure during sintering. Sufficient doping of the passivating layer with the material of the metal structure, for example, with silver, ensures that the passivating layer can take up no further metal during sintering. As a result, the quality of the cosintered metal structure is always maintained, regardless of the amount of passivating material used.

The doping with the material of the metal structure in the passivating layer is preferably greater than in the main element. The passivating layer is preferably doped with more than 1 mol percent, for example, 2 or 5 mol percent, of the metal of the metal structure. In particular, the doping of the passivating layer can be greater than the saturation value, since there is no longer any active region there, and the material of the metal structure can increase only to the saturation value in the main element but no higher.

According to a further aspect, a process for producing a multilayer component is provided. The multilayer component preferably corresponds to the multilayer component described above. In particular, the production process can serve for producing a multilayer component as described above. All features which have been described in connection with the multilayer component also apply to the process and vice versa. The process comprises the following steps:

arrangement of layers comprising a ceramic composition and layers comprising an electrode paste alternately on top of one another to form a stack of layers. The ceramic composition is doped with a material of the electrode paste, in particular with a chemical compound of the metal of the electrode paste. The ceramic composition is preferably doped with from 0.1 to 1 mol percent of the material of the electrode paste.

sintering of the stack of layers to give ceramic layers having internal electrodes arranged in between.

The multilayer component produced by the process comprises a ceramic material which is doped with a proportion of the electrode material and in which the ceramic material is sintered together with the metallic material. As a result of the doping of the ceramic, the loss of electrode material by diffusion can be reduced or prevented.

In one illustrative embodiment, the electrode paste comprises silver. The electrode paste is preferably additionally doped with a material of the ceramic composition. For example, the electrode paste is doped with ZnO. However, other dopings of the electrode paste with material of the ceramic composition (for example, with $Sb_2O_3$, $Bi_2O_3$, $Co_3O_4$, $Mn_2O_3$, $SiO_2$, $Cr_2O_3$, $B_2O_3$, $Al_2O_3$, NiO or a combination thereof) are also conceivable.

The ceramic composition is preferably doped with silver oxide or silver carbonate. As an alternative, the electrode paste can also comprise palladium and the ceramic composition can be doped with a palladium alloy. As an alternative, the electrode paste can also comprise an alloy of palladium and silver and the ceramic composition can be doped with silver.

In one illustrative embodiment, the ceramic composition comprises zinc oxide and bismuth oxide. Sintering is preferably carried out at a temperature of less than or equal to 1000° C., for example, at 960° C. In particular, sintering is carried out at a temperature of 960° C. or less when the electrode paste comprises silver. For example, sintering is carried out at a temperature of greater than or equal to 1100° C., for example, 1200°, when the electrode paste comprises essentially palladium. For example, sintering is carried out at a temperature of about 1000° C. when the electrode paste comprises an alloy of palladium and silver.

In one illustrative embodiment, the process comprises the following additional step: application of an insulating layer on at least one upper side of the ceramic composition, wherein the insulating layer is doped with a material of the electrode paste. The insulating layer can also be doped with a material of the ceramic composition. The insulating layer is preferably doped with the main dopants from the ceramic composition.

The insulating layer is preferably doped with a higher proportion of the material of the electrode paste than the ceramic composition. The insulating layer is applied before sintering. The insulating layer comprises, for example, a further ceramic composition.

BRIEF DESCRIPTION OF THE DRAWINGS

The invention will be illustrated below with the aid of illustrative embodiments and the associated figures.

The drawings described below are not to be interpreted as true to scale. Rather, individual dimensions can be shown larger, smaller or even distorted to give better depiction.

Elements which are identical or perform the same function are denoted by the same reference numerals.

Figure 1:
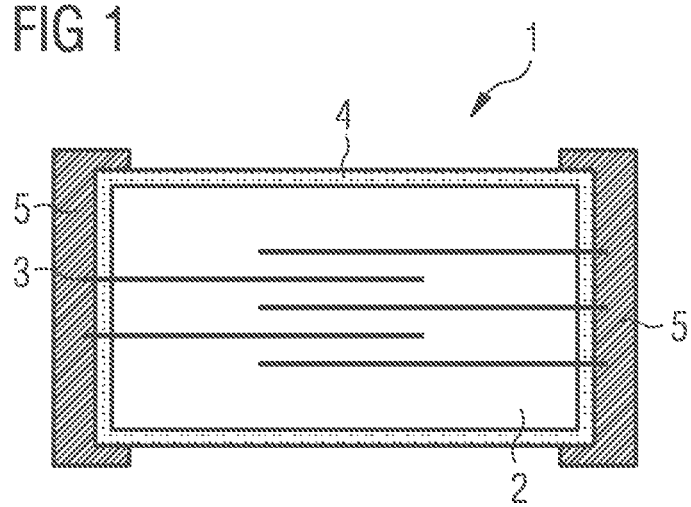
Figure 2:
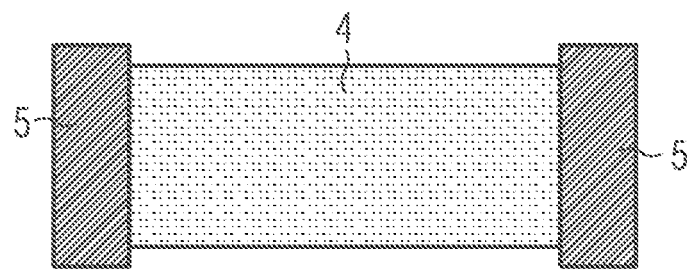
Figure 3:
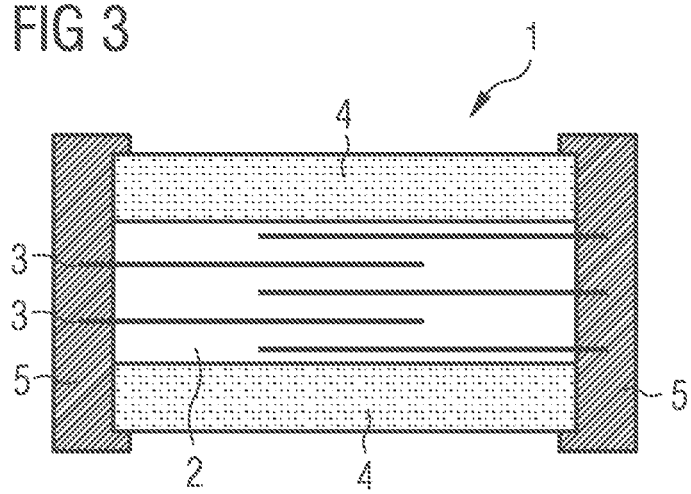
Figure 6A:
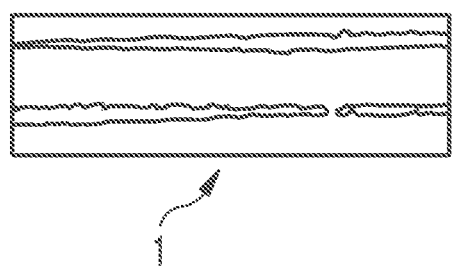
Figure 6B:
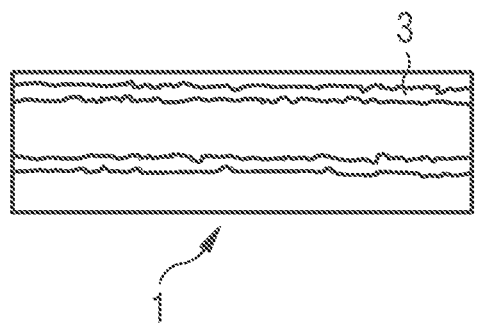
Figure 7:
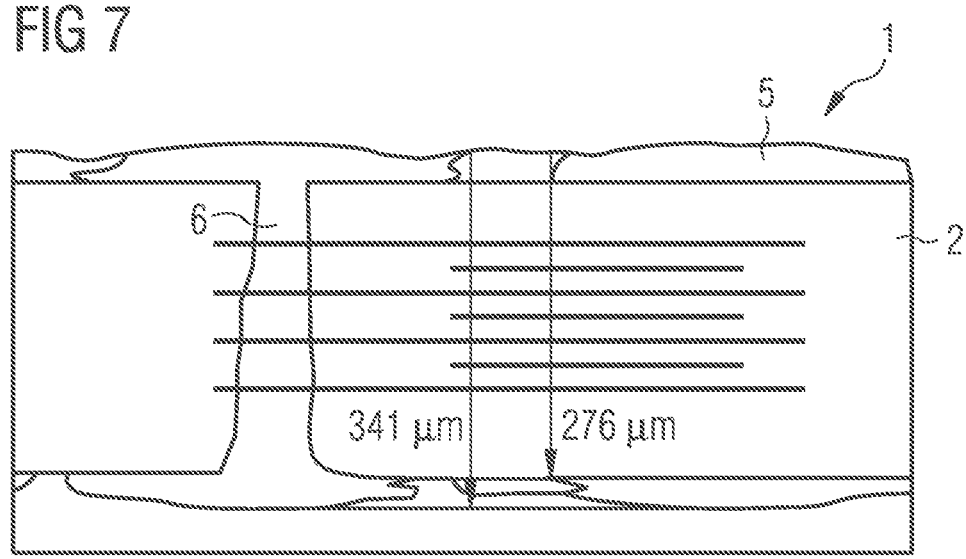

FIG. 1 schematically shows a multilayer component in cross section,

FIG. 2 shows the multilayer component of FIG. 1 in plan view,

FIG. 3 schematically shows a multilayer component in cross section,

FIG. 4 schematically shows a multilayer component in cross section,

FIG. 5 shows the multilayer component of FIG. 4 in plan view,

FIG. 6A shows an image of an actual multilayer component according to the prior art, FIG. 6B shows an image of an actual multilayer component according to the invention, and FIG. 7 shows an image of an actual multilayer component according to the invention.

DETAILED DESCRIPTION OF ILLUSTRATIVE EMBODIMENTS

FIG. 1 schematically shows a multilayer component in cross section.

The multilayer component 1 is a varistor multilayer component. The multilayer component 1 comprises a ceramic main element 2. The main element 2 consists of a plurality of layers. The multilayer component 1 comprises metal structures. In particular, internal electrodes 3 are arranged between the layers of the main element 2 in this illustrative embodiment. Internal electrodes 3 and ceramic main element 2 are sintered together (cosintered) in order to obtain the finished multilayer component 1.

The main element 2 is a zinc oxide (ZnO) varistor in this illustrative embodiment. In particular, the main element 2 comprises about 95 mol percent of ZnO. $Sb_2O_3$, $Bi_2O_3$ can be present as further material of the main element, for example, in the range from 0.5 to 5 mol percent. Furthermore, the main element 2 can comprise $Co_3O_4$, $Mn_2O_3$, $SiO_2$, $Cr_2O_3$, for example, in the range from 0.05 to 0.2 mol percent. Furthermore, materials such as $B_2O_3$, $Al_2O_3$ and NiO can be present in concentrations of less than 0.1 mol percent. The ceramic further comprises a sintering aid, for example, bismuth oxide.

The internal electrodes 3 comprise a metal. In particular, the internal electrodes 3 comprise silver (Ag). The internal electrodes preferably comprise more than 90 percent by weight of silver, for example, 95 or 98 or 99 percent by weight. As an alternative to silver, the internal electrodes 3 can comprise a different metal, for example, palladium. In this case, the internal electrodes 3 preferably comprise essentially palladium.

The internal electrodes 3 are made particularly thin. In particular, the internal electrodes 3 have a thickness of less than or equal to 1.5 μm, for example, 1.4 μm or 1.2 μm or 1.0 μm. The thickness of the internal electrodes 3 is preferably selected so that it is just sufficient to withstand a sintering process. The only small thickness of the internal electrodes 3 significantly reduces the risk of delamination in which the electrode layer becomes detached from the ceramic material of the main element 2, making the component 1 unstable. Furthermore, an electrode layer having a small thickness has the advantage that a volume of the component 1 can be utilized better for an equal function.

The main element 2 further comprises electrode material as material. In particular, the main element 2 is doped with a chemical compound of the metal of the internal electrodes 3. The ceramic material of the main element 2 is preferably doped with silver oxide or silver carbonate. As an alternative, the main element can also be doped with a palladium compound when the internal electrodes 3 correspondingly comprise palladium. For example, the main element is doped with a proportion of from 0.1 to 1 mol percent of the chemical compound of the metal of the internal electrodes 3.

As a result of the doping of the ceramic material of the main element 2 with electrode material, diffusion of the material of the internal electrodes 3 into the ceramic volume during a sintering operation can be controlled or avoided. In particular, the proportion of electrode material in the ceramic can produce a diffusion equilibrium which prevents diffusion of electrode metal into the ceramic during sintering. The influence of the internal electrodes 3 on the ceramic properties can thus be reduced.

After sintering of ceramic main element 2 and internal electrodes 3, a passivating layer 4 is applied to the multilayer component 1 in this illustrative embodiment. The passivating layer 4 is applied to a surface or outside of the main element 2. In particular, the passivating layer 4 covers the entire surface of the main element 2. The passivating layer 4 protects the main element 2 against external influences. The passivating layer 4 can, for example, comprise glass having a filler material or a ceramic. The passivating layer 4 can comprise a varistor ceramic.

Furthermore, the multilayer component 1 has external metallizations 5 for electrical connection of the multilayer component 1. The external metallizations 5 are arranged on opposite side faces of the component 1. The external metallizations 5 preferably comprise the same material as the internal electrodes 3. For example, the external metallizations 5 comprise silver.

The external metallizations 5 are arranged on the passivating layer 4. The external metallizations 5 are, in this illustrative embodiment, likewise applied after the sintering operation. FIG. 2 shows the passivating layer 4 applied after sintering and also the external metallizations 5 in plan view.

FIG. 3 schematically shows a multilayer component according to a further illustrative embodiment.

In contrast to the multilayer component described in connection with FIGS. 1 and 2, the passivating layer 4 is sintered together with the main element 2 and the internal electrodes 3 in the multilayer component 1 shown in FIG. 3. For this purpose, the passivating layer 4 is applied to the main element 2 before sintering. The passivating layer 4 is applied to the entire surface of the main element 2 or only to subregions of the surface of the main element 2.

In order to cosinter the passivating layer 4, the material of the passivating layer 4 is doped with electrode material. The passivating layer 4 is preferably doped with silver. Here, the silver doping can be the same as or greater than the saturation value of silver in the passivating layer 4 because there is no longer any electrically active region in the passivating layer 4. Degradation of the metal structures (internal electrodes 3) during sintering can be prevented by the doping of the passivating layer 4.

FIG. 4 schematically shows a multilayer component according to a further illustrative embodiment.

In this illustrative embodiment, the multilayer component 1 comprises a ceramic main element 2, with the main element 2 being configured as ZnO substrate or support element.

Metal structures are arranged in the main element 2. In particular, internal electrodes 3 and vias 6 are arranged in the main element 2. While the internal electrodes 3 run horizontally through the main element 2, the vias 6 are arranged perpendicular to the internal electrodes 3. Internal electrodes 3, vias 6 and ceramic main element 2 are cosintered in order to obtain the finished multilayer component 1.

The internal electrodes 3 and vias 6 comprise a metal. The internal electrodes 3 and vias 6 preferably comprise silver. As an alternative, the internal electrodes 3 and vias 6 can also comprise palladium, as described above. As described above in connection with the illustrative embodiment shown in FIGS. 1 and 2, the metal structures (internal electrodes 3, vias 6) are made particularly thin. The internal electrodes 3 have a thickness of less than or equal to 1.5 µm, for example, 1.0 µm or 1.2 µm. The vias 6 also have only a small lateral extension.

The main element 2 further comprises material of the metal structures as material. This prevents diffusion of electrode material into the main element 2 during the sintering operation. Furthermore, reference is made to what has been said in connection with FIGS. 1 and 2.

Like the multilayer component 1 of FIGS. 1 and 2, the multilayer component 1 of FIG. 4 has a passivating layer 4 and also external metallizations 5. Passivating layer 4 and external metallizations 5 are, in this illustrative embodiment, applied after the sintering operation. FIG. 5 shows the passivating layer 4 applied after sintering and also the external metallizations 5 in plan view.

Passivating layer 4 and external metallization 5 can also be cosintered, as has been described above in connection with the preceding figures. In this case, sufficient doping of the passivating layer 4 with the material of the metal structures is necessary.

The process for producing a multilayer component is described by way of example below. In particular, a process for producing a multilayer component which comprises metal structures comprising essentially silver is described. As an alternative, a multilayer component which comprises metal structures comprising essentially palladium or an alloy of palladium and silver can also be produced by a corresponding process.

To produce varistors having a multilayer structure, green ceramic sheets are firstly produced from the dielectric ceramic components. As described above, the ceramic sheets can comprise the following constituents:

ZnO in an amount of about 95 mol percent;
doping with $Sb_2O_3$, $Bi_2O_3$ in the range from 0.5 to 5 mol percent;
doping with $Co_3O_4$, $Mn_2O_3$, $SiO_2$, $Cr_2O_3$ in the range from 0.05 to 2 mol percent;
doping with $B_2O_3$, $Al_2O_3$ and NiO in concentrations of less than 0.1 mol percent.

Furthermore, the ceramic has to be of such a nature that it can be sintered with high quality at below the melting point of the material of the metal structures (preferably silver). For this reason, a liquid phase which exists even at low temperatures is required during sintering. This is ensured by a liquid phase such as bismuth oxide. The ceramic is consequently based on zinc oxide doped with bismuth oxide. The doping with bismuth oxide generally increases the diffusion of silver from the internal electrodes 3, but this is prevented by doping of the ceramic with silver.

The ceramic is, in particular, doped with silver oxide or silver carbonate. The doping is selected so that the ceramic is saturated with silver even before sintering. The saturation leads to the ceramic no longer being able to take up any silver during the sintering operation. As a result, no loss of material occurs from the metal structure (here: internal electrodes 3) during sintering. Due to the doping of the ceramic sheets with silver oxide/silver carbonate, the ceramic formulation can also comprise a relatively large amount of sintering aid such as bismuth oxide, for example, to reduce the porosity.

Finally, the ceramic also comprises an organic binder preparation.

The internal electrodes 3 are applied to these ceramic sheets by coating the green ceramic with a metallizing paste in the electrode pattern. These metallized green films are stacked. As metallizing paste or electrode paste for internal electrodes, use is made of a paste which comprises essentially silver as metallic component.

The green body is subsequently sintered, with the binder, in particular its organic constituents, being volatilized. The sintering temperature is matched to the material of the internal electrodes 3. In the case of the Ag internal electrodes, the sintering temperature is preferably less than 1000° C., particularly preferably less than 960° C. The sintering temperature is, for example, 900° C.

The diffusion of electrode material into the ceramic during sintering thus displays the following behaviour: at a sintering temperature of 900° C. and a silver concentration of more than 0.1 mol percent in the ceramic sheets, the diffusion constant is $7 \cdot 10^{-11}$ cm²/s. At a sintering temperature of 900° C. and a silver concentration of less than 0.1 mol percent in the ceramic sheets, the diffusion constant is $3 \cdot 10^{-8}$ cm²/s.

As a result of the doping of the ceramic, the silver content in the ceramic is independent of sintering, the formulation of the ceramic or the shape and quantity of the metal structures. This leads to the ceramic always having constant properties both in respect of the thermal properties (thermal expansion, shrinkage) and in respect of the electrical properties (capacity, V-I curve, robustness).

According to the illustrative embodiment shown in FIG. 3, the passivating layer 4 can also be cosintered. In this case, the passivating layer 4 is applied to an outside or surface of the ceramic sheets before sintering. In the case of cosintering with the passivating material, the latter also has to be doped with silver so that no silver can diffuse into the passivating layer 4 during sintering. Here, the doping can be higher than the saturation value of the passivating material.

In a further illustrative embodiment which is not shown, the external metallization 5 can also be cosintered. In this case, the external metallization 5 is applied to an outside or surface of the ceramic sheets or to the passivation before sintering. The external metallization 5 comprises essentially silver. The diffusion of silver is prevented by the doping of the ceramic sheets with silver (and in the case of cosintering of the passivation, also by the silver doping therein).

According to the illustrative embodiment shown in FIG. 4, the main element 2 can be used as substrate or support element after sintering. FIG. 7 shows an image of an actual multilayer component. In this case, further metal structures (vias 6) can be introduced into the green body before sintering and subsequently be jointly sintered. The further metal structures likewise comprise essential silver. The diffusion of silver is prevented by the doping of the ceramic sheets with silver (and in the case of cosintering of the passivation, also by the silver doping therein).

FIG. 6B shows an image of an actual multilayer component according to the invention. The regular profile of the internal electrodes 3 is conspicuous here. In particular, it can be seen that no loss of material from the internal electrodes 3 has taken place during the sintering operation. This is in contrast to multilayer components according to the prior art in which the ceramic body has not been doped with the electrode material (silver) (see FIG. 6A).

The description of the subjects and processes indicated here is not restricted to the individual specific embodiments. Rather, the features of the individual embodiments can, in so far as it is technically feasible, be combined with one another in any way.

The invention claimed is:

1. A support element comprising:
    a ceramic main element being a varistor ceramic sintered with an aid of liquid phases; and
    a metal structure arranged in the ceramic main element, wherein the metal structure comprises at least one internal electrode and at least one via, wherein the metal structure further comprises ≥99% of silver and is cosintered, wherein the main element is doped with 0.1 to 1 mol percent of a metal compound of a material of the metal structure such that a diffusion of the material from the metal structure into the main element during a sintering operation is reduced, and
    wherein the ceramic main element has the composition:
        ≥90 mol % of ZnO,
        from to mol % of $Sb_2O_3$ or $Bi_2O_3$,
        from 0.05 to 2 mol % of $Co_3O_4$, $Mn_2O_3$, $SiO_2$ and/or $Cr_2O_3$, and
        <0.1 mol % of $B_2O_3$, $Al_2O_3$ and/or NiO.

2. The support element according to claim 1, wherein the metal structure is doped with at least one material of the ceramic main element.

3. The support element according to claim 1, wherein a thickness or lateral extension of the metal structure is less than or equal to 1.5 μm.

4. The support element according to claim 1, wherein a doping material comprises silver oxide or silver carbonate.

5. The support element according to claim 1, further comprising at least one passivating layer, wherein the passivating layer is cosintered, and wherein the passivating layer comprises a glass including a filler material or a ceramic.

6. The support element according to claim 5, wherein the passivating layer is doped with the material of the metal structure and the doping is greater than or equal to a saturation concentration of the material in the passivating layer.

7. A method for producing a support element with a ceramic main element and a metal structure, the method comprising:
    arranging layers comprising a ceramic composition and layers comprising an electrode paste alternately on top of one another to form a stack of layers for producing a green body;
    introducing at least one via into the green body; and
    sintering the green body with an aid of liquid phases to provide ceramic layers with at least one internal electrode and at least one via arranged in between,
    wherein the ceramic main element is a varistor ceramic,
    wherein the at least one internal electrode and at the least one via comprise ≥99% of silver,
    wherein the main element is doped with 0.1 to 1 mol percent of a chemical compound of a material of the metal structure such that a diffusion of the material from the metal structure into the main element during a sintering operation is reduced, and
    wherein the ceramic main element has the composition:
        ≥90 mol % of ZnO,
        from 0.5 to 5 mol % of $Sb_2O_3$ or $Bi_2O_3$,
        from 0.05 to 2 mol % of $Co_3O_4$, $Mn_2O_3$, $SiO_2$ and/or $Cr_2O_3$,
        <0.1 mol % of $B_2O_3$, $Al_2O_3$ and/or NiO.

8. The method according to claim 7, wherein the electrode paste is doped with at least one material of the ceramic composition and the ceramic composition is doped with silver oxide or silver carbonate.

9. The method according to claim 7, further comprising applying an insulating layer on at least one upper side of the ceramic composition, wherein the insulating layer is doped with the material of the electrode paste and at least one material of the ceramic composition, wherein the insulating layer is applied before sintering.

\* \* \* \* \*

UNITED STATES PATENT AND TRADEMARK OFFICE
CERTIFICATE OF CORRECTION

PATENT NO. : 10,262,778 B2
APPLICATION NO. : 15/548338
DATED : April 16, 2019
INVENTOR(S) : Wozniak Page 1 of 1

It is certified that error appears in the above-identified patent and that said Letters Patent is hereby corrected as shown below:

In the Claims

In Column 10, Line 19, Claim 1, delete "from to mol % of $Sb_2O_3$ or $Bi_2O_3$," and insert -- from 0.5 to 5 mol% of $Sb_2O_3$ or $Bi_2O_3$, --.

Signed and Sealed this
Second Day of July, 2019

Andrei Iancu
*Director of the United States Patent and Trademark Office*